US012806852B2

(12) United States Patent
Hikmet et al.

(10) Patent No.: US 12,806,852 B2
(45) Date of Patent: Nov. 24, 2026

(54) METHOD FOR PRINTING A 3D OBJECT USING FIBER BUNDLES

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 117 days.

(21) Appl. No.: 18/841,262

(22) PCT Filed: Mar. 22, 2023

(86) PCT No.: PCT/EP2023/057326
§ 371 (c)(1),
(2) Date: Aug. 23, 2024

(87) PCT Pub. No.: WO2023/186656
PCT Pub. Date: Oct. 5, 2023

(65) Prior Publication Data

US 2025/0170772 A1 May 29, 2025

(30) Foreign Application Priority Data

Mar. 28, 2022 (EP) .................................... 22164704

(51) Int. Cl.
*B29C 64/118* (2017.01)
*B29C 64/314* (2017.01)
(Continued)

(52) U.S. Cl.
CPC .......... *B29C 64/118* (2017.08); *B29C 64/314* (2017.08); *B29K 2101/12* (2013.01);
(Continued)

(58) Field of Classification Search
None
See application file for complete search history.

(56) References Cited

U.S. PATENT DOCUMENTS 9,744,722 B2 8/2017 Rodgers
2014/0141168 A1* 5/2014 Rodgers ................. B33Y 70/00
427/265
(Continued)

FOREIGN PATENT DOCUMENTS

WO 2020144135 A1 7/2020
WO 2020185862 A1 9/2020

OTHER PUBLICATIONS

Scoubidou. The Wayback Machine—https://web.archive.org/web/20210703012401/https://en.wikipedia.org/wiki/Scoubidou; Mar. 8, 2022 11:16, 6 pgs.

*Primary Examiner* — Virak Nguon

(57) ABSTRACT

The present invention relates to a method for manufacturing a 3D item by means of fused deposition modelling. The method comprises the steps of providing a 3D printable material (120), feeding the 3D printable material into a printer head (110) via an entrance opening (111), melting the 3D printable material in the printer head, and layer-wise depositing the 3D printable material to provide the 3D item comprising a plurality of layers (141) of 3D printed material. The 3D printable material (120) comprises a filament assembly of a plurality of filaments. At the entrance opening of the printer head and in a cross section perpendicular to a direction of elongation of the filament assembly, (i) the filament assembly has a smallest bounding circle with a smallest bounding diameter and a smallest bounding circumference, (ii) each filament has a filament diameter and a filament circumference, and (iii) the plurality of filaments has a compound filament circumference, the compound filament circumference being the sum of the filament cir- (Continued)

cumferences. The smallest bounding diameter is in a range of 1 millimeter to 1 centimeter, and the filament diameter is equal to or smaller than 500 micrometers. Furthermore, the ratio of the compound filament circumference and the smallest bounding circumference is higher than 1. The method further comprises the step of drying the plurality of filaments before the step of feeding the 3D printable material into a printer head via an entrance opening. Instead of using a single-filament printable material, the method of the invention uses a multi-filament printable material with an increased surface area, which in turn results in a reduced drying time of the printable material as a whole.

11 Claims, 5 Drawing Sheets

(51) Int. Cl.
*B29K 101/12* (2006.01)
*B33Y 10/00* (2015.01)
*B33Y 30/00* (2015.01)
*B33Y 40/10* (2020.01)
*B33Y 70/00* (2020.01)

(52) U.S. Cl.
CPC ............... *B33Y 10/00* (2014.12); *B33Y 30/00* (2014.12); *B33Y 40/10* (2020.01); *B33Y 70/00* (2014.12)

(56) References Cited

U.S. PATENT DOCUMENTS

| | | | | |
|---|---|---|---|---|
| 2018/0229434 | A1 | 8/2018 | Tyler | |
| 2019/0217525 | A1 | 7/2019 | Mark et al. | |
| 2020/0001528 | A1 | 1/2020 | Tyler et al. | |
| 2020/0324461 | A1 | 10/2020 | Mark et al. | |
| 2020/0324462 | A1* | 10/2020 | Newell | B29C 64/118 |
| 2021/0283845 | A1 | 9/2021 | Ageishi | |
| 2021/0362406 | A1 | 11/2021 | Kim et al. | |

* cited by examiner

METHOD FOR PRINTING A 3D OBJECT USING FIBER BUNDLES

CROSS-REFERENCE TO PRIOR APPLICATIONS

This application is the U.S. National Phase application under 35 U.S.C. § 371 of International Application No. PCT/EP2023/057326, filed on Mar. 22, 2023, which claims the benefit of European Patent Application No. 22164704.3, filed on Mar. 28, 2022. These applications are hereby incorporated by reference herein.

FIELD OF THE INVENTION

The present invention relates to a method for manufacturing a 3D item. Further, the invention relates to a 3D printable material for use in such a method, and a 3D item obtainable by such a method. Further, the invention relates to a 3D printer for use in such a method.

BACKGROUND OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals, and polymers.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, such as for thermoplastics, the filament is melted and extruded before being laid down. In general, FDM printers use a thermoplastic filament, which is heated to (or above) its melting point and then extruded, layer by layer, to create a three-dimensional object. FDM printers are relatively fast, low cost and can be used for printing complicated 3D objects. Such printers are used in printing various shapes using various polymers. The technique is also being further developed in the production of LED luminaires and lighting solutions.

The printer head of an FDM printer is normally fed with filaments having a diameter of 1.75 mm or 2.85 mm at a constant speed. In order to obtain 3D items having virtually no defects and sufficient mechanical integrity, it is necessary to dry the filaments before printing. For this reason, filaments are placed in ovens with a dry atmosphere before and/or during printing. However, this is a disadvantageous step from the perspective of energy consumption and time.

Therefore, there is a need to provide a method for manufacturing a 3D item wherein the duration of the step of drying the 3D printable material is minimized.

US-2021/362406 discloses a scheme for the production of a continuous fiber reinforced thermoplastic composite material, which material is applicable to production of a reinforcing material of various thermoplastic injection products and to manufacture of a fiber reinforced thermoplastic plastic part using 3D printing. The continuous fiber reinforced thermoplastic composite material has a plurality of yarns or tape intermediate materials that are combined together to form a rod shape.

SUMMARY OF THE INVENTION

Considering the above, the present invention provides such a method for manufacturing a 3D item by means of fused deposition modelling using a 3D printer having a printer head with an entrance opening. The method of the present invention comprises the steps of:

a) providing a 3D printable material.
b) feeding the 3D printable material into a printer head via the entrance opening.
c) melting the 3D printable material in the printer head.
d) layer-wise depositing the 3D printable material to provide the 3D item comprising a plurality of layers of 3D printed material.

The 3D printable material comprises a filament assembly of a plurality of filaments, each filament of the filament assembly comprising a thermoplastic polymer.

At the entrance opening of the printer head and in a cross section perpendicular to a direction of elongation of the filament assembly, (i) the filament assembly has a smallest bounding circle with a smallest bounding diameter and a smallest bounding circumference, (ii) each filament has a filament diameter and a filament circumference, and (iii) the plurality of filaments has a compound filament circumference, the compound filament circumference being the sum of the filament circumferences The smallest bounding diameter is in a range of 1 millimeter to 1 centimeter, and the filament diameter is equal to or smaller than 500 micrometers. Furthermore, the ratio of the compound filament circumference and the smallest bounding circumference is higher than 1, such as at least 2.

The method further comprises the step of:

g) drying the plurality of filaments (302), wherein this step g) occurs before step b. As said, the smallest bounding diameter is in a range of 1 millimeter to 1 centimeter, such as in a range of 1.2 millimeter to 0.5 centimeter, or in a range of 1.4 millimeter to 0.4 centimeter, or in a range of 1.5 millimeter to 0.3 centimeter.

As said, the filament diameter is equal to or smaller than 500 micrometers, such equal to or smaller than 400 micrometers, or equal to or smaller than 350 micrometers, or equal to or smaller than 300 micrometers.

The filament diameter may be equal to or larger than 20 micrometers, such as equal to or larger than 30 micrometers, or equal to or larger than 40 micrometers, or equal to or larger than 50 micrometers.

As said, the ratio of the compound filament circumference and the smallest bounding circumference is higher than 1, such as higher than 2, or higher than 3, or higher than 4.

The method of the invention makes use of a 3D printer that has a printer head with an entrance opening. In other words, the printer head has at least one entrance opening for receiving a printable material.

In a typical method for manufacturing a 3D item by means of fused deposition modelling, an entrance opening of a printer head only receives a single filament at a time. Multiple filaments may be used, but these are then fed into the printer head via different entrance openings.

In the method of the invention, the printer head has an entrance opening that receives a plurality of filaments that together constitute a filament assembly.

In a cross section perpendicular to a direction of elongation of the filament assembly, this filament assembly has a smallest bounding circle. This is the smallest virtual circle that one can draw around the plurality of filaments that together constitute the filament assembly. This smallest bounding circle has a diameter, which is referred to as the smallest bounding diameter, and a circumference, which is referred to as the smallest bounding circumference.

In the aforementioned cross section, each filament of the plurality of filaments that together constitute the filament assembly has a filament diameter and a filament circumference. All circumferences of the filaments added together is referred to as the compound filament circumference of the plurality of filaments.

The smallest bounding diameter of the filament assembly has a value within the range of 1 millimeter to 1 centimeter. This range covers the diameters of conventional single-filament printable materials that are typically used for FDM printing.

Each filament of the filament assembly has a diameter that is equal to or smaller than 500 micrometers, which is significantly smaller than conventional single-filament printable materials that are typically used for FDM printing.

The filament assembly is further defined in that the ratio of the compound filament circumference and the smallest bounding circumference is higher than 1. In other words, the sum of the individual filament circumferences is larger than the circumference of the smallest bounding circle of the filament assembly. For example, the ratio of the compound filament circumference and the smallest bounding circumference may be at least 2, so that the sum of the individual filament circumferences is at least twice as large as the circumference of the smallest bounding circle of the filament assembly.

Instead of using a single-filament printable material, the method of the invention uses a multi-filament printable material with an increased surface area, which in turn results in a reduced drying time of the printable material as a whole.

Each filament in the filament assembly has a filament diameter that is equal to or less than 500 micrometers. At the same time, in order to enable a smooth and efficient feeding of the 3D printable material into the printer head, the filament assembly has a smallest bounding diameter in a range of 1 millimeter to 1 centimeter, such as in a range of 2 millimeters to 1 centimeter, or in a range of 3 millimeters to 1 centimeter, or in a range of 4 millimeters to 1 centimeter.

Since the drying time is inversely related to the square radius of the filament, the drying time can be reduced significantly. For example, decreasing the diameter by a factor of ten can decrease the drying time by a factor of 100. This enables drying of filaments in a step that constitutes an integral part of the manufacturing method (i.e., the 3D printing process). In other words, this enables in-line drying of filaments.

Using such relatively thin filaments is cost-efficient since they can be mass produced with a high dimensional accuracy and lower cost.

The term "plurality" means two or more. In particular, the filament assembly may comprise at least three filaments, such as at least five filaments, or at least ten filaments.

The term "3D printable material" refers to a material that is to be deposited or printed, and the term "3D printed material" refers to a material that is obtained after deposition. The 3D printable material and the 3D printed material may be essentially the same material, as the 3D printable material may refer to the material in a printer head or extruder at elevated temperature, while the 3D printed material refers to the same material, but in a later stage when deposited.

The raw material that is used in any additive manufacturing process or 3D printing process to create a finished product is typically referred to as the feedstock (or starting material). For FDM, the feedstock typically has the form of a filament or a granulate. Whatever feedstock (or starting material) is used, a 3D printable material in the form of a filament is provided by the printer head and 3D printed. The term "extrudate" may be used to define the 3D printable material downstream of the printer head, but prior to being deposited. The latter, i.e., the deposited material, is indicated as "3D printed material". In fact, the extrudate comprises 3D printable material, as the material is not yet deposited. Upon deposition of the 3D printable material or extrudate, the material is thus indicated as 3D printed material. Normally, the 3D printable material, the extrudate and 3D printed material are the same material, as the material upstream of the printer head, downstream of the printer head, and when deposited, is substantially the same material.

The step of feeding the 3D printable material into the printer head via the entrance opening may be performed using any suitable feeder.

In the step of melting the 3D printable material in the printer head, the plurality of filaments that together constitute the filament assembly may be melted such that a substantially homogeneous 3D printable material is obtained. Alternatively, the plurality of filaments that together constitute the filament assembly may also be melted such that a 3D printable material is obtained that, at least partly, still retains the configuration of the filament assembly. For example, if the filament is assembly is formed by weaving the plurality of filaments, the woven configuration may at least partly be retained upon melting the 3D printable material in the printer head.

The molten 3D printable material obtained in the above step is used in the subsequent step of layer-wise depositing the 3D printable material to provide the 3D item comprising a plurality of layers of 3D printed material.

The 3D printable material used in the method of the invention comprises a filament assembly of a plurality of filaments. Such a filament assembly may have been prepared separately from the method of the invention. In this case, the feedstock (or starting material) of the method is already a filament assembly of a plurality of filaments. Alternatively, one or more steps for forming the filament assembly may constitute an integral part of the manufacturing method (i.e., the 3D printing process). In other words, the filament assembly may be formed in-line. In this case, the starting material of the method is the plurality of filaments, and the method comprises one or more steps for forming the plurality of filaments into the filament assembly. The filaments of the plurality of filaments are then preferably provided as separate filaments that are not already integrated with each other.

The steps of providing a plurality of filaments and then forming the plurality of filaments into the filament assembly may occur at any time prior to the step of melting the 3D printable material in the printer head. For example, these steps may be performed simultaneously with the step of feeding the 3D printable material into the printer head via the entrance opening.

The step of forming the plurality of filaments into the filament assembly may comprise one or more of bundling, weaving, twisting, and braiding. Thus, the filaments in the filament assembly may be bundled, woven, twisted, braided or any combination thereof. This has the advantage of improving the mechanical integrity for feeding the filament assembly into and through the printer head. Alternatively, or in addition, the filament assembly may be obtained by joining the filaments through pointwise melting prior to feeding the filament assembly into the printer head of the 3D printer.

The method comprises a step of drying the plurality of filaments, so that drying of the filaments is performed in-line with the 3D printing process. Such drying step occurs before the step of feeding the 3D printable material into the printer head via the entrance opening. Since the plurality of filaments that constitute the filament assembly have a diameter that is significantly lower compared to the diameter of conventional single-filament 3D printable material, the duration of the drying step may be shortened, thereby saving energy costs, and minimizing manufacturing time. The step of drying the plurality of filaments may be performed by using any suitable method known in the art, such as oven drying or blow drying.

The steps of drying the plurality of filaments and forming the plurality of filaments into the filament assembly may be performed in the 3D printer. In this case, the 3D printer has a drying device located upstream of the entrance opening of the printer head. The drying device is arranged to dry the plurality of filaments before the 3D printable material is received by the printer head. Suitable examples of a drying device are an oven and a blow dryer. This has the advantage of a simplified and cost-efficient production process, since the step of forming the plurality of filaments into the filament assembly as well as the step of drying are performed in-line.

The filament assembly may comprise at least a first group of filaments and a second group of filaments, wherein the first group of filaments has a property being different from a property of the second group of filaments. For instance, the first group of filaments may comprise a first thermoplastic polymer, and the second group of filaments may comprise a second thermoplastic polymer being different from the first thermoplastic polymer. The first thermoplastic polymer and/or the second thermoplastic polymer may be a single material or may be a combination of two or more materials.

The first thermoplastic polymer and/or the second thermoplastic polymer may comprise or be polycarbonate (PC), polyethylene (PE), high-density polyethylene (HDPE), polypropylene (PP), polyoxymethylene (POM), polyethylene naphthalate (PEN), styreneacrylonitrile resin (SAN), polysulfone (PSU), polyphenylene sulfide (PPS), and semicrystalline polytethylene terephthalate (PET), acrylonitrile butadiene styrene (ABS), poly(methyl methacrylate) (PMMA), polystyrene (PS), and styrene acrylic copolymers (SMMA) and/or combinations thereof.

Additionally, or alternatively, the first group of filaments may comprise a first additive, and the second group of filaments may comprise a second additive being different from the first additive. The first additive and/or the second additive may be particles or a pigment. The filaments in the filament assembly will melt and mix in the nozzle of the 3D printer, which allows for great variation possibilities provided by the method of the present invention.

The first group of filaments may comprise first particles and the second group of filaments may comprise second particles being different from the first particles.

The first particles and/or second particles may be selected from the group consisting of light scattering particles, light reflective particles, light conversion particles, light absorbing particles, thermally conductive particles. The light scattering particles may be $BaSO_4$, $Al_2O_3$ and/or $TiO_2$ particles. Light conversion particles may be phosphor particles including different phosphor particles. Light reflective particles may include but are not limited to flakes and/or glitters. Examples of flakes are silver and/or aluminum flakes. Examples of glitters are PET foil cut parts which may have one or more coatings and/or layers. Examples of light absorbing particles are graphite particles. Thermally conductive particles are particles with a relatively high thermal conductivity such as for example copper particles.

As said, the filament assembly may comprise a first group of filaments and a second group of filaments, wherein the first group of filaments has a property being different from a property of the second group of filaments.

The property that differs between the first and second groups of filaments may be color. For example, when the filament assembly comprises ten filaments selected from two filament groups of different colors, 3D printed items having ten different colors and/or color tones can be obtained.

Alternatively, or additionally, the property that differs between the first and second groups of filaments may be another optical property, such as reflection, diffusion, or transmissivity.

A 3D item that is manufactured by the method described above comprises a plurality of layers on top of each other, i.e., the 3D item comprises a layer stack. Each layer of the layer stack has a width $W_L$ and a height $H_L$. The height of a layer is the dimension of the layer in a direction parallel to the stacking direction, and the width of a layer is a dimension perpendicular to the height of the layer.

The width $W_L$ and height $H_L$ of individually 3D printed layers may be selected from the range of 100 to 5000 μm, such as 200 to 500 μm, with the height $H_L$ in general being smaller than the width $W_L$. For instance, the ratio of height $H_L$ and width $W_L$ may be equal to or smaller than 0.8, such as equal to or smaller than 0.6. It should be noted that the layer width $W_L$ and/or the layer height $H_L$ of each layer may be the same as or different from the layer width $W_L$ and/or the layer height $H_L$ of the other layers. The layer stack of the 3D item may comprise at least 5 layers, such as at least 8 layers, or at least 10 layers.

As said, the 3D printable material used in the method of the invention comprises a filament assembly of a plurality of filaments, wherein the filament assembly may have been prepared separately from the method of the invention. In other words, the feedstock (or starting material) of the method may already be a filament assembly of a plurality of filaments.

Such feedstock (or starting material) in the form of a filament assembly of a plurality of filaments that can be used as a 3D printable material for manufacturing a 3D item by means of fused deposition modelling represents a further aspect of the invention.

The aforementioned 3D printable material for manufacturing a 3D item by means of fused deposition modelling comprises a filament assembly of a plurality of filaments, wherein each filament of the filament assembly comprises a thermoplastic polymer.

In a cross section perpendicular to a direction of elongation of the filament assembly, (i) the filament assembly has a smallest bounding circle with a smallest bounding diameter and a smallest bounding circumference, (ii) each filament has a filament diameter and a filament circumference, and (iii) the plurality of filaments has a compound filament circumference, the compound filament circumference being the sum of the filament circumferences The smallest bounding diameter is in a range of 1 millimeter to 1 centimeter, and the filament diameter is equal to or smaller than 500 micrometers.

Furthermore, the ratio of the compound filament circumference and the smallest bounding circumference is higher than 1.

Each filament of the filament assembly has a diameter that is equal to or smaller than 500 micrometers, which is significantly smaller than conventional single-filament printable materials that are typically used for FDM printing.

Since the drying time is inversely related to the square radius of the filament, the drying time can be reduced significantly. For example, decreasing the diameter by a factor of ten can decrease the drying time by a factor of 100. This enables online drying of filaments. Using such thin filaments is cost-efficient since they are mass produced with a high dimensional accuracy and lower cost.

The filament assembly may comprise at least three filaments, such as at least five filaments, or at least ten filaments.

The plurality of filaments may comprise at least three filaments, such as at least five filaments, or at least eight filaments, or at least ten filaments. A higher number of filaments results in a higher compound filament circumference and consequently a further decrease of the duration of the step of drying the 3D printable material.

The plurality of filaments may comprise less than 500 filaments, such as less than 300 filaments, or less than 100 filaments, or less than 50 filaments. These (individual) filaments need to be manufactured, for example by means of extrusion. Producing a higher number of filaments may increase cost. Furthermore, for a higher number of filaments it may be more difficult to control the dimensions of the filaments.

The filament assembly may comprise at least a first group of filaments and a second group of filaments, wherein the first group of filaments has a property being different from a property of the second group of filaments. For instance, the first group of filaments may comprise a first thermoplastic polymer, and the second group of filaments may comprise a second thermoplastic polymer being different from the first thermoplastic polymer. Additionally, or alternatively, the first group of filaments may comprise a first additive, and the second group of filaments may comprise a second additive being different from the first additive. The first additive and/or the second additive may be particles or a pigment. The filaments in the filament assembly will melt and mix in the nozzle of the 3D printer, which allows for great variation possibilities provided by the method of the present invention.

The aforementioned property that differs between the first group of filaments and the second group of filaments may be color. For example, if the filament assembly comprises ten filaments selected from two filaments groups of different colors, 3D printed items having 10 different colors and/or color tones can be obtained.

A 3D printer for manufacturing a 3D item by means of fused deposition modelling comprises a printer head with an entrance opening for receiving a 3D printable material. When the 3D printer is to be used for performing the method of the invention, the entrance opening of the printer head is arranged to receive a 3D printable material comprising a filament assembly of a plurality of filaments.

The aforementioned 3D printer may further comprise an assembling element for receiving the plurality of filaments and for providing the filament assembly. This assembling element is arranged upstream from the entrance opening of the printer head, such that, in operation, the plurality of filaments passes through the assembling element and is formed into a filament assembly prior to entering the printer head and being fed through the printer head. As mentioned above, thinner filaments may thus be used, thereby significantly reducing the drying time, while at the same time the structural integrity is maintained by arranging the filaments into the filament assembly.

The assembling element may be a rotatable guiding plate comprising a plurality of apertures for receiving the plurality of filaments. The filaments are fed through the apertures of the guiding plate, and the rotational movement of the guiding plate twists the filaments thereby forming a filament assembly.

As mentioned above, the 3D printable material may include an additive. Such additive may be present up to a volume percentage of about 60 vol. %, such as up to a volume percentage of about 30 vol. %, or up to a volume percentage of about 20 vol. % relative to the total volume of the thermoplastic material and additives.

The additive may be selected from a group consisting of antioxidants, heat stabilizers, light stabilizers, ultraviolet light stabilizers, ultraviolet light absorbing additives, near infrared light absorbing additives, infrared light absorbing additives, plasticizers, lubricants, release agents, antistatic agents, anti-fog agents, antimicrobial agents, colorants, laser marking additives, surface effect additives, radiation stabilizers, flame retardants, and anti-drip agents. The additive may have useful properties selected from optical properties, electrical properties, thermal properties, and mechanical properties.

As said, the filament assembly may comprise a first group of filaments and a second group of filaments, wherein the first group of filaments may comprise a first thermoplastic polymer, and the second group of filaments may comprise a second thermoplastic polymer being different from the first thermoplastic polymer.

In general, a thermoplastic polymer has a glass transition temperature $T_g$ and/or a melting temperature $T_m$. The glass transition temperature $T_g$ and/or the melting temperature $T_m$ of the first thermoplastic polymer may be same as or different from the glass transition temperature $T_g$ and/or the melting temperature $T_m$ of the second thermoplastic polymer.

The 3D printable material will be heated by the 3D printer before it leaves the printer head to a temperature of at least the glass transition temperature $T_g$, and in general at least the melting temperature $T_m$. Hence, the printer head action may comprise heating the 3D printable material above the glass transition temperature $T_g$, or above the melting temperature $T_m$. It should be noted that melting occurs when the polymer chains fall out of their crystal structures and become a disordered liquid, while glass transition is a transition which happens to amorphous polymers. Amorphous polymers are polymers whose chains are not arranged in ordered crystals, but are just strewn around in any fashion, even though they are in the solid state. Polymers can be amorphous, essentially having a glass transition temperature $T_g$ and not a melting temperature $T_m$, or they can be (semi) crystalline, in general having both a glass transition temperature $T_g$ and a melting temperature $T_m$, with in general the latter being higher than the former. The glass transition temperature $T_g$ and the melting temperature $T_m$ may be determined with differential scanning calorimetry.

The 3D printable material is printed on a receiver item. Especially, the receiver item can be a building platform, or it can be comprised in the building platform. The receiver item may be heated during 3D printing, but it may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform. Instead of the term "receiver item" also the term "substrate" may be used. Therefore, the phrase "printing on a substrate" and similar phrases include amongst others directly printing on the substrate, or printing on a coating on the substrate or printing on 3D printed material earlier printed on the substrate.

The 3D printable material is deposited in a layer-by-layer fashion, by which the 3D item is generated during a 3D printing stage. The 3D item may show a characteristic ribbed structure originating from the deposited layers. However, it may also be possible that after a printing stage, a further stage (or post-processing stage) is executed, such as a finalization stage. This stage may include removing the 3D item from the receiver item and/or one or more further post-processing actions. Such further post-processing actions may be executed before removing the 3D item from the receiver item, and/or after removing the 3D item from the receiver item.

Post-processing may include one or more of polishing, coating, adding a functional component, and cross-linking.

Post-processing may include smoothening the ribbed structures, which may lead to an essentially smooth surface.

Post-processing may include cross-linking of the thermoplastic material, which may in turn result in fewer or no thermoplastic properties of the 3D printed material.

The 3D item that can be manufactured by the method of the invention may be used as a component of a device. For example, the 3D item may be a component of a lighting device, such as a luminaire or a lamp.

Such a lighting device comprises a light source and the 3D item manufactured by the method of the invention, wherein the 3D item is configured as one or more of (i) at least part of a lighting device housing, (ii) at least part of a wall of a lighting chamber, and (iii) an optical element.

In operation, the light source emits light, and at least part of the emitted light may be transmitted and/or reflected by at least part of the 3D item.

BRIEF DESCRIPTION OF THE DRAWINGS

Embodiments of the invention will now be described, by way of example only, with reference to the accompanying schematic drawings in which corresponding reference symbols indicate corresponding parts, and in which.

Figure 1:
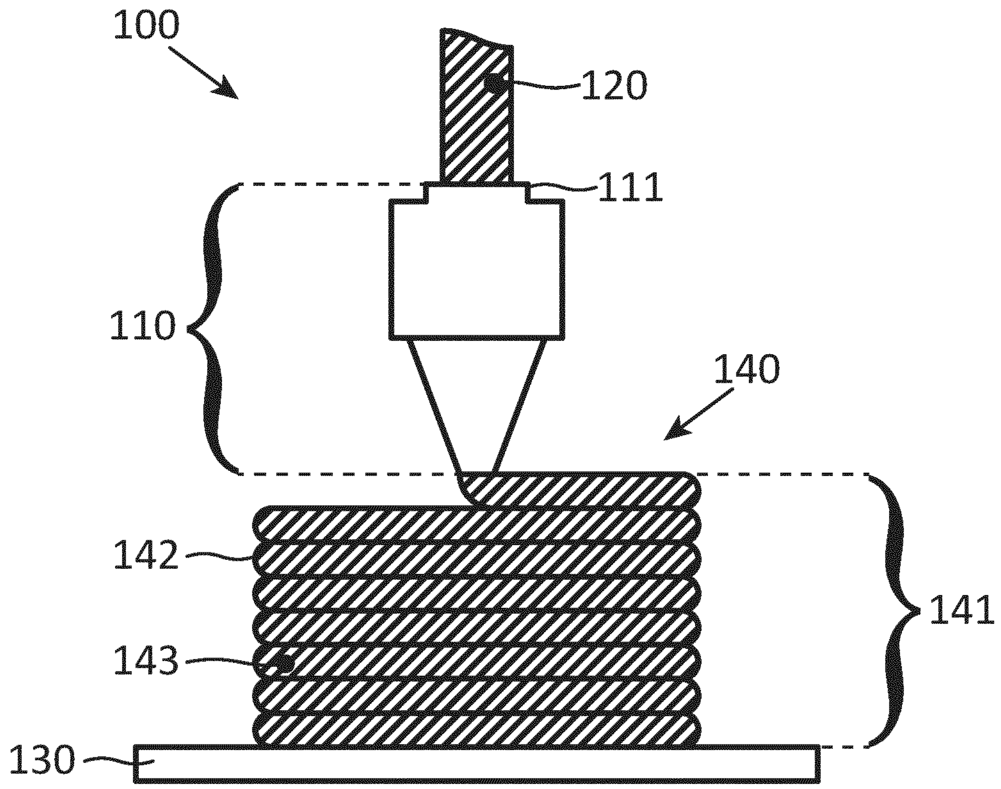
FIG. 1 schematically depicts a 3D printer for use in a method for manufacturing a 3D item by means of fused deposition modelling.

All the figures are schematic, not necessarily to scale, and generally only show parts which are necessary in order to elucidate embodiments of the present invention, wherein other parts may be omitted or merely suggested.

DETAILED DESCRIPTION OF THE EMBODIMENTS

The present invention will now be described hereinafter with reference to the accompanying drawings, in which exemplifying embodiments of the present invention are shown. The present invention may, however, be embodied in many different forms and should not be construed as limited to the embodiments of the present invention set forth herein; rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 schematically depicts a 3D printer 100 for use in a method for manufacturing a 3D item by means of fused deposition modelling. The 3D printer 100 may also be referred to as an FDM printer.

The 3D printer 100 has a printer head 110 with an entrance opening 111 for receiving a 3D printable material 120.

The 3D printable material 120 is fed into the printer head 110 via the entrance opening 111. In the printer head 110, the 3D printable material 120 is melted and subsequently deposited in a layer-wise manner by the printer head 110 on a building platform 130 to provide a 3D item 140.

The 3D item 140 has a layer stack 141 comprising a plurality of layers 142 of 3D printed material 143.

Figure 2:
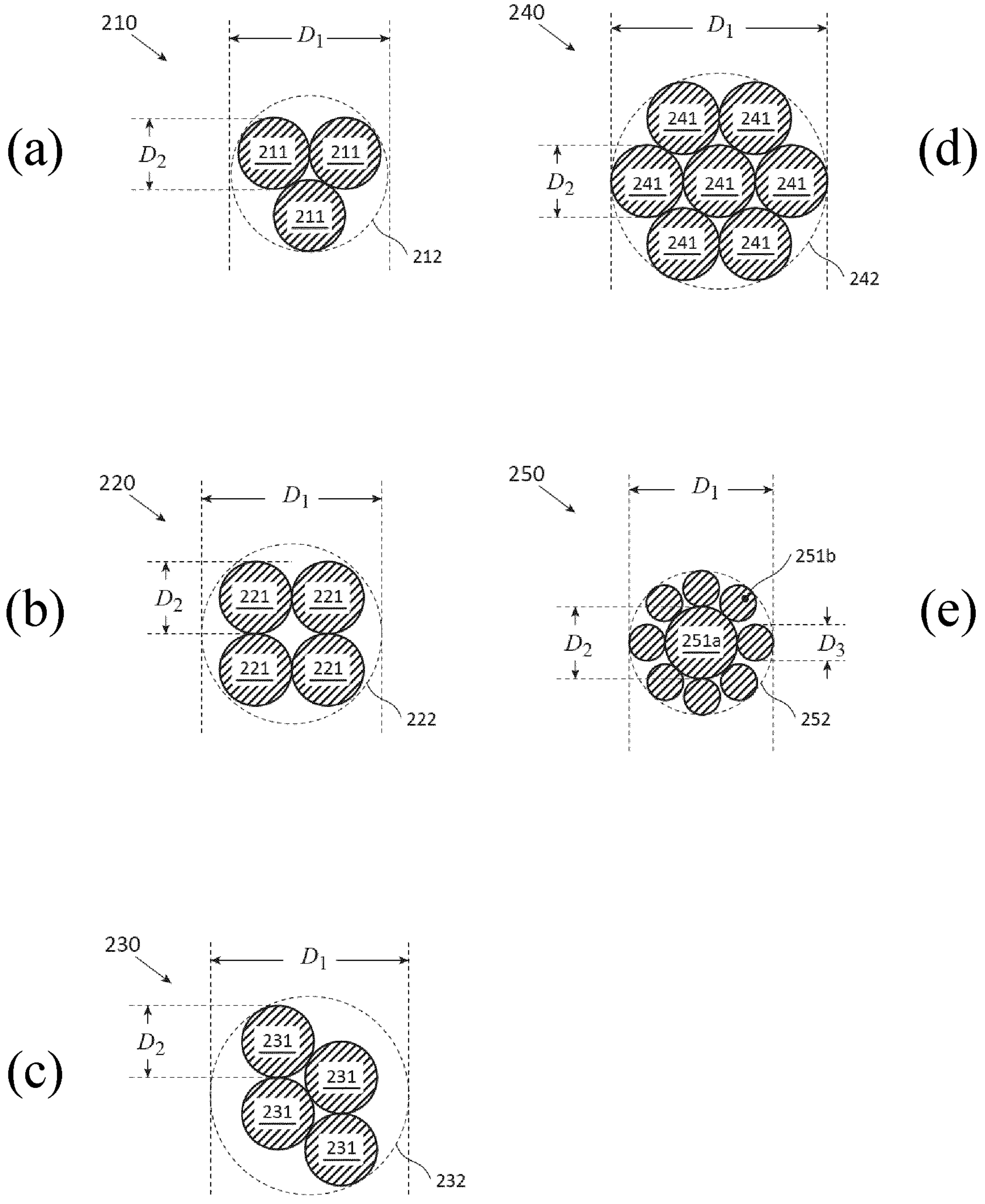
FIGS. 2(*a*) to 2(*e*) each show a cross section of a filament assembly of a plurality of filaments.

Each of FIGS. 2(*a*) to 2(*e*) shows a cross section of a filament assembly of a plurality of filaments. Each cross section is perpendicular to a direction of elongation of the respective filament assembly.

FIG. 2(*a*) shows a cross section of filament assembly 210 of a plurality of filaments 211. In this case, the filament assembly 210 has three filaments 211.

The filament assembly 210 has a smallest bounding circle 212, which is the smallest possible circle that still encloses all filaments 211. The smallest bounding circle 212 has a smallest bounding diameter $D_1$ and a smallest bounding circumference, which is equal to $\pi D_1$.

The filaments 211 all have the same filament diameter $D_2$ and filament circumference $\pi D_2$.

The plurality of filaments 211 has a compound filament circumference, being the sum of the individual filament circumferences, which is equal to $3\pi D_2$. In the filament assembly 210, the ratio of the compound filament circumference and the smallest bounding circumference is equal to $3/(1+(2\sqrt{}v3))$, which is about 1.4.

FIG. 2(*b*) shows a cross section of filament assembly 220 of a plurality of filaments 221. In this case, the filament assembly 220 has four filaments 221.

The filament assembly 220 has a smallest bounding circle 222, which is the smallest possible circle that still encloses all filaments 221. The smallest bounding circle 222 has a smallest bounding diameter $D_1$ and a smallest bounding circumference, which is equal to $\pi D_1$.

The filaments 221 all have the same filament diameter $D_2$ and filament circumference $\pi D_2$.

The plurality of filaments 221 has a compound filament circumference, being the sum of the individual filament circumferences, which is equal to $4\pi D_2$.

In the filament assembly 220, the ratio of the compound filament circumference and the smallest bounding circumference is equal to $4/(1+(2/\sqrt{2}))$, which is about 1.7.

FIG. 2(*c*) shows a cross section of filament assembly 230 of a plurality of filaments 231. Similar to FIG. 2(*b*), the filament assembly 230 again has four filaments 231 with the same filament diameter $D_2$ and filament circumference $\pi D_2$, but now the filaments are arranged differently.

The filament assembly 230 has a smallest bounding circle 232, which is the smallest possible circle that still encloses all filaments 231. The smallest bounding circle 232 has a smallest bounding diameter $D_1$ and a smallest bounding circumference, which is equal to $\pi D_1$.

The plurality of filaments 231 has a compound filament circumference, being the sum of the individual filament circumferences, which is equal to $4\pi D_2$.

In the filament assembly 230, the ratio of the compound filament circumference and the smallest bounding circumference is equal to $4/(1+\sqrt{3})$, which is about 1.5.

FIG. 2(*d*) shows a cross section of filament assembly 240 of a plurality of filaments 241. In this case, the filament assembly 240 has seven filaments 241.

The filament assembly 240 has a smallest bounding circle 242, which is the smallest possible circle that still encloses all filaments 241. The smallest bounding circle 242 has a smallest bounding diameter $D_1$ and a smallest bounding circumference, which is equal to $\pi D_1$.

The filaments 241 all have the same filament diameter $D_2$ and filament circumference $\pi D_2$.

The plurality of filaments 241 has a compound filament circumference, being the sum of the individual filament circumferences, which is equal to $7\pi D_2$.

In the filament assembly 240, the ratio of the compound filament circumference and the smallest bounding circumference is equal to 7/3, which is about 2.3.

FIG. 2(*e*) shows a cross section of filament assembly 250 of a plurality of filaments. In this case, the filament assembly 250 has nine filaments.

The filament assembly 250 has a smallest bounding circle 252, which is the smallest possible circle that still encloses all filaments The smallest bounding circle 252 has a smallest bounding diameter $D_1$ and a smallest bounding circumference, which is equal to $\pi D_1$.

In the filament assembly 250, the filaments do not all have the same filament diameter. One of the seven filaments 251*a*, being a central filament of the filament assembly 250, has a diameter $D_2$, while the remaining six filaments 251*b* that surround the central filament each have a diameter $D_3$ that is half that of diameter $D_2(D_3=D_2/2)$.

The central filament has a filament circumference $\pi D_2$, and each of the surrounding filaments has a filament circumference $\pi D_2/2$.

The plurality of filaments 251 has a compound filament circumference, being the sum of the individual filament circumferences, which is equal to $4\pi D_2$.

In the filament assembly 250, the ratio of the compound filament circumference and the smallest bounding circumference is equal to 2.

As illustrated in FIGS. 2(*a*) to 2(*e*), the filaments of the filament assembly may be filaments of the same diameter, but they may also be filaments of different diameter. Also, in the filament assembly, the filaments may be arranged in any particular way.

For each of the filament assemblies illustrated in FIGS. 2(*a*) to 2(*e*), the sum of the individual filament circumferences (i.e., the compound filament circumference) is higher than the circumference of a conventional single-filament printable material of a similar size (i.e., the smallest bounding circumference). This has the result that, compared to the conventional single-filament printable material, the filament assembly has a reduced drying time.

Also, for each of the filament assemblies illustrated in FIGS. 2(*a*) to 2(*e*), the diameters of the individual filaments (i.e., the filament diameters) are smaller than the diameter of a conventional single-filament printable material of a similar size (i.e., the smallest bounding diameter). For example, in the filament assemblies 210 of FIGS. 2(*a*) and 220 of FIG. 2(*b*), the filament diameter $D_2$ is less than half of the smallest bounding diameter $D_1$, and in the filament assembly 240 of FIG. 2(*d*), the filament diameter $D_2$ is one third of the smallest bounding diameter $D_1$. A smaller diameter (or thickness of the filament) results in a higher drying speed and therefore a reduced drying time.

Figure 3:
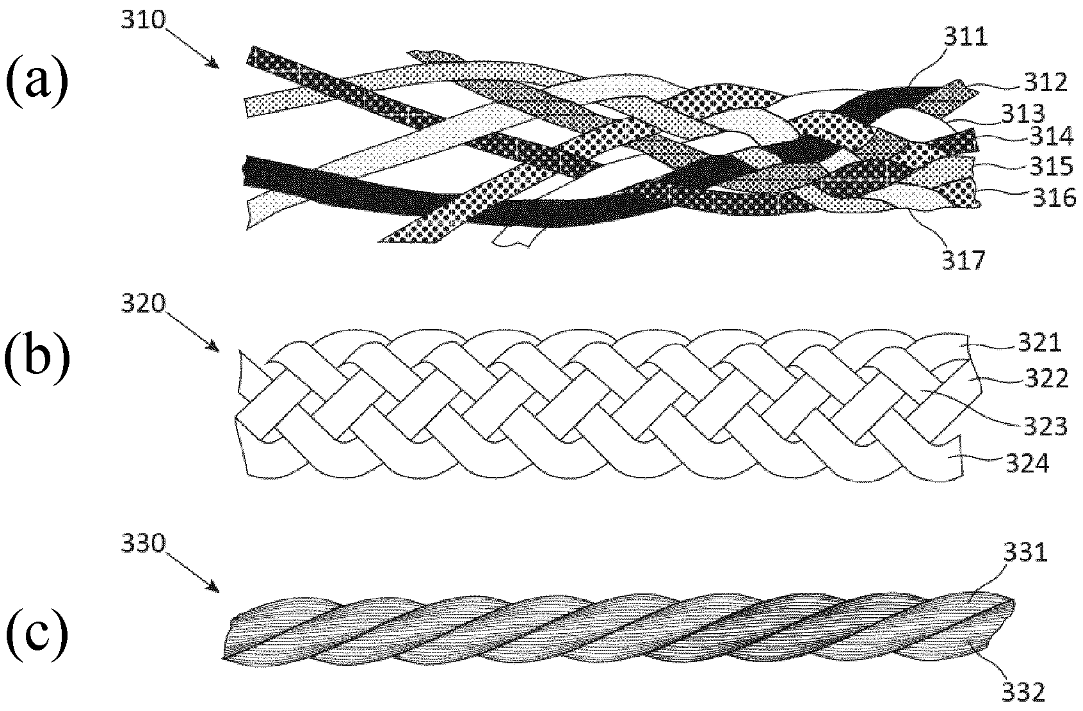
FIGS. 3(*a*) to 3(*c*) each show a filament assembly of a plurality of filaments.

FIGS. 3(*a*), 3(*b*) and 3(*c*) show a filament assembly 310, a filament assembly 320, and a filament assembly 330, respectively. Each of these filament assemblies comprises a plurality of filaments, wherein each filament has a diameter that is significantly smaller as compared to conventional filaments currently used for FDM printing.

In FIG. 3(*a*), the filament assembly 310 comprises seven filaments 311, 312, 313, 314, 315, 316, and 317, respectively. These filaments all have a unique color.

Alternatively, two or more filaments, or even all filaments, may have the same color. Instead of the property of color, which is an example of an optical property, the filaments may also be different from each other in respect of one or more other optical properties, such as reflection, diffusion, or transmissivity.

The filaments may be different in respect of the material of the filaments. For example, one or more filaments may be made from a first thermoplastic polymer, while one or more other filaments may be made from a second thermoplastic polymer, different from the first thermoplastic polymer.

The filaments may be different in respect of the geometry of the filaments. For example, in a cross section perpendicular to a direction of elongation of the filament, one or more filaments may have a first diameter while one or more other filaments have a second diameter, different the first diameter.

In FIG. 3(*b*), the filament assembly 320 comprises four filaments 321, 322, 323, and 324, respectively. These are all identical filaments.

In FIG. 3(*c*), the filament assembly 330 comprises two filaments 331 and 332, respectively. These are all identical filaments.

In the filament assembly 310 and the filament assembly 320, the plurality of filaments is woven. In the filament assembly 330, the plurality of filaments is twisted. Alternatively, the plurality of filaments may be bundled or braided.

Figure 4:
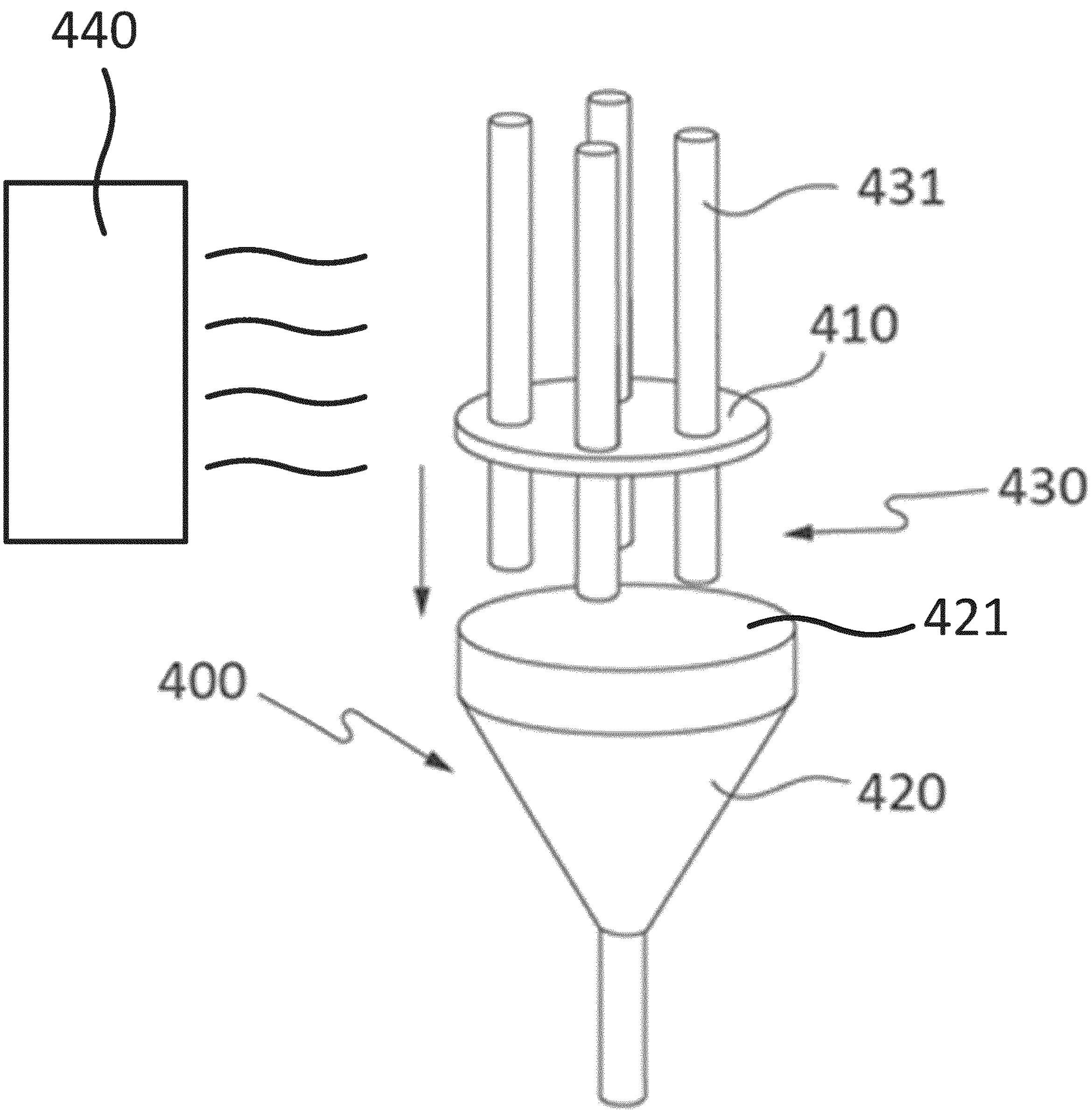
FIG. 4 shows components of a 3D printer for manufacturing a 3D item by means of fused deposition modelling.

FIG. 4 shows components of a 3D printer 400 for manufacturing a 3D item by means of fused deposition modelling.

One of the components shown in FIG. 4 is an assembling element 410 for providing the filament assembly 430 comprising a plurality of filaments 431. The assembling element 410 has a guiding plate with a plurality of apertures, each for receiving a filament 431.

The assembling element 410 is arranged upstream from the printer head 420, such that the plurality of filaments 431 passes through the assembling element 410 and are formed into a filament assembly 430 prior to being fed through the printer head 420 via the entrance opening 421.

As mentioned above, relatively thin filaments may be used, thereby significantly reducing the drying time, at the same time maintaining structural integrity by arranging the filaments into the filament assembly.

The 3D printer 400 has a drying device 440, which is arranged at a location upstream of the entrance opening 421 of the printer head 420. The drying device 440 is arranged to dry the plurality of filaments 431 before the 3D printable material is received by the printer head 420. The drying device 440 may be an oven, a blow dryer, or any other device suitable for drying the plurality of filaments 431.

In FIG. 4, the filaments 431 in the filament assembly 430 are not integrated by twisting or the like but are merely held together and guided by the assembling element 410.

Alternatively, the guiding plate of the assembling element may be rotatable. The filaments are then fed through the apertures of the guiding plate, and the rotational movement of the guiding plate twists the filaments thereby forming a filament assembly.

In case the filaments 431 in the filament assembly 430 are integrated by twisting or the like, the drying device 440 is preferably at a location upstream of the location where the (twisted) filament assembly 430 is formed. In other words, when the assembling element 410 is arranged to provide the filament assembly 430 by one or more of bundling, weaving, twisting, or braiding the plurality of filaments 431, the drying device 440 is located upstream of the assembling element 410.

The aforementioned method results in the manufacture of a 3D item, such as 3D item 140 as illustrated in FIG. 1.

The 3D item may be used as a component of a device, such as a component of a lighting device.

Figure 5:
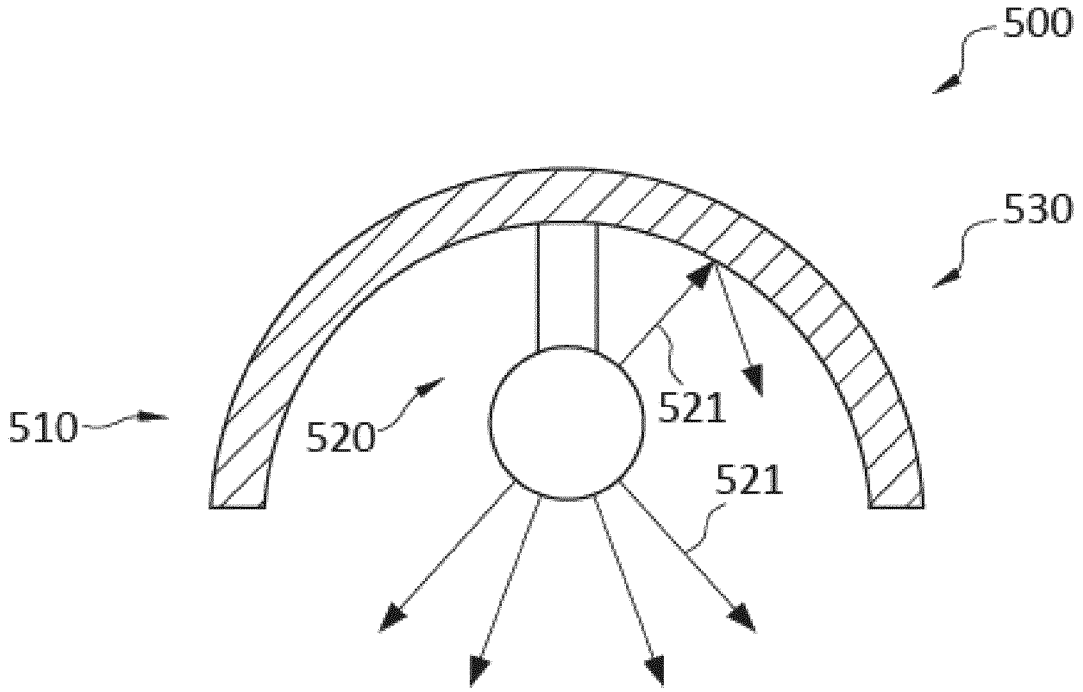
FIG. 5 schematically depicts a lighting device comprising a 3D item.

FIG. 5 schematically depicts a lighting device 500, which is or comprises a lamp or luminaire 510 for generating light source light 521. The lamp or luminaire 510 may comprise a housing or shade or any other element, which may comprise or be the 3D item 530.

In FIG. 5, 3D item 530, drawn as a half sphere in cross-sectional view, schematically indicates a housing or a shade.

Hence, the lighting device 500 comprises the 3D item 530, which may be configured as one or more of (i) at least part of a lighting device housing, (ii) at least part of a wall of a lighting chamber, and (iii) an optical element. Hence, the 3D item 530 may be reflective for the light source light 521 and/or transmissive for the light source light 521.

Although the present invention has been described with reference to various embodiments, those skilled in the art will recognize that changes may be made without departing from the scope of the invention. It is intended that the detailed description be regarded as illustrative and that the appended claims including all the equivalents are intended to define the scope of the invention. While the present invention has been illustrated in the appended drawings and the foregoing description, such illustration is to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. In the appended claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method for manufacturing a 3D item by means of fused deposition modelling using a 3D printer having a printer head with an entrance opening, wherein the method comprises the steps of:

a) providing a 3D printable material, a2) assembling the 3D printable material into a filament assembly of a plurality of filaments, each filament of the filament assembly comprising a thermoplastic polymer, a3) drying the plurality of filaments, b) feeding the dried plurality of filaments into the printer head via the entrance opening, c) melting the 3D printable material in the printer head, and d) layer-wise depositing the 3D printable material to provide the 3D item comprising a plurality of layers of 3D printed material, wherein, at the entrance opening of the printer head and in a cross section perpendicular to a direction of elongation of the filament assembly, (i) the filament assembly has a smallest bounding circle, being the smallest virtual circle that one can draw around the plurality of filaments that together constitute the filament assembly, the smallest bounding circle having a smallest bounding diameter and a smallest bounding circumference, (ii) each filament has a filament diameter and a filament circumference, and (iii) the plurality of filaments has a compound filament circumference, the compound filament circumference being the sum of the filament circumferences, wherein the smallest bounding diameter is in a range of 1 millimeter to 1 centimeter, and the filament diameter of each filament is equal to or smaller than 500 micrometers, and wherein the ratio of the compound filament circumference and the smallest bounding circumference is higher than 1.

2. The method according to claim 1, wherein the method further comprises the steps of:

e) providing a plurality of filaments, each filament comprising a thermoplastic polymer, and f) forming the plurality of filaments into the filament assembly.

3. The method according to claim 2, wherein step f) comprises one or more of bundling, weaving, twisting, and braiding.

4. The method according to claim 2, wherein at least one of step f) and step a2) is performed in the 3D printer.

5. The method according to claim 1, wherein the plurality of filaments comprises a first group of filaments and a second group of filaments, and wherein the first group of filaments has a property being different from a property of the second group of filaments.

6. The method according to claim 5, wherein the first group of filaments comprises a first thermoplastic polymer, and wherein the second group of filaments comprises a second thermoplastic polymer being different from the first thermoplastic polymer.

7. The method according to claim 5, wherein the first group of filaments comprises first particles, and wherein the second group of filaments comprises second particles being different from the first particles.

8. The method according to claim 1, wherein the smallest bounding circumference is at least 2 mm.

9. The method according to claim 1, wherein the filament assembly comprises at least five filaments.

10. A 3D printer for manufacturing a 3D item by means of fused deposition modelling, wherein the 3D printer comprises a printer head with an entrance opening for receiving a 3D printable material comprising a filament assembly of a plurality of filaments, wherein the 3D printer comprises a drying device located upstream of the entrance opening of the printer head, the drying device being arranged to dry the plurality of filaments before the 3D printable material is received by the printer head, and wherein the 3D printer comprises an assembling element for receiving the plurality of filaments and for providing the filament assembly.

11. The 3D printer according to claim 10, wherein the assembling element is arranged to provide the filament assembly by one or more of bundling, weaving, twisting, or braiding the plurality of filaments.

* * * * *